Figure 2:
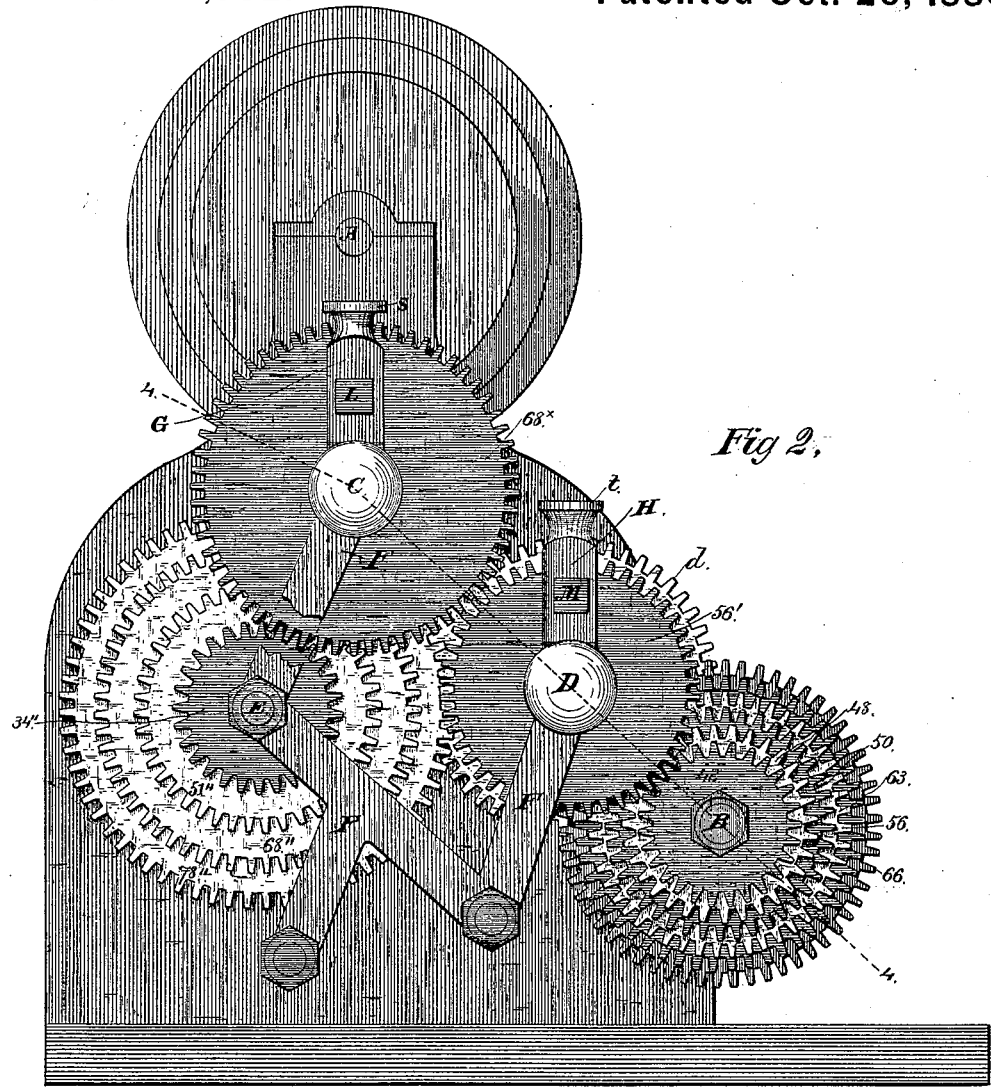

C. W. RILEY.
Screw Cutting Lathe.
No. 233,702. Patented Oct. 26, 1880.
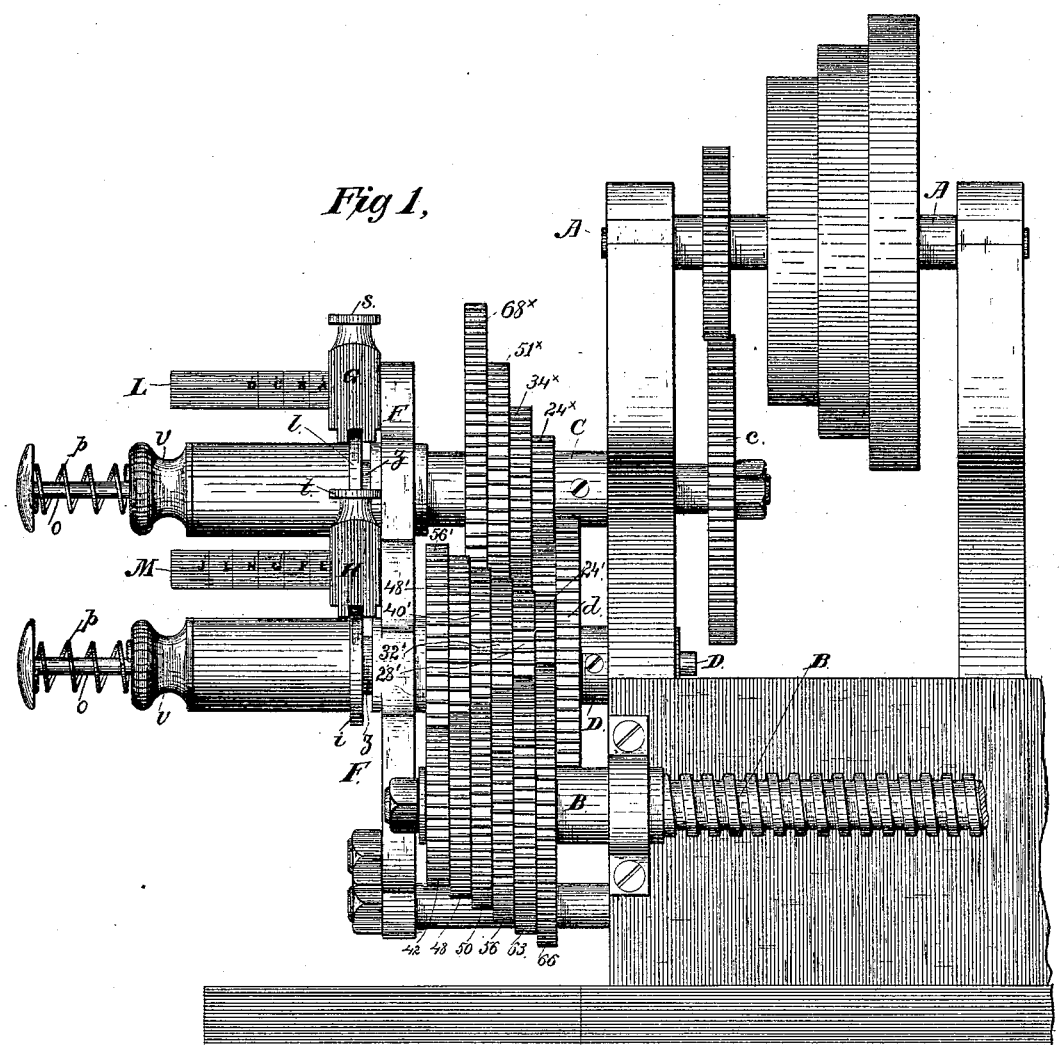
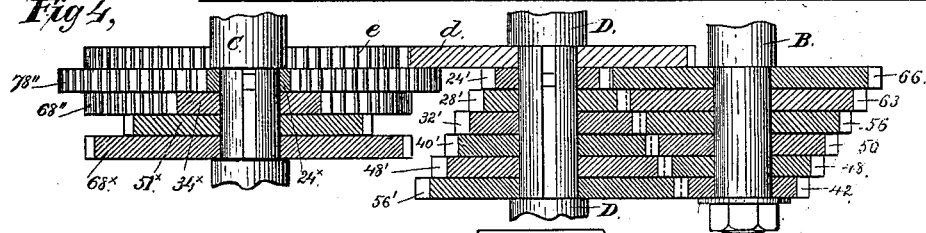

3 Sheets—Sheet 2.

C. W. RILEY.
Screw Cutting Lathe.

No. 233,702. Patented Oct. 26, 1880.

Attest:
Geo. F. Smallwood Jr
Walter Allen

Inventor:
Charles William Riley
By Knight Bros
Attys.

3 Sheets—Sheet 3.

C. W. RILEY.
Screw Cutting Lathe.

No. 233,702. Patented Oct. 26, 1880.

Attest
Geo. T. Smallwood Jr.
Walter Allen

Inventor:
Charles W. Riley
By Knight Bros
Attys

UNITED STATES PATENT OFFICE.

CHARLES W. RILEY, OF KNOXVILLE, TENNESSEE.

SCREW-CUTTING LATHE.

SPECIFICATION forming part of Letters Patent No. 233,702, dated October 26, 1880.

Application filed December 8, 1879.

*To all whom it may concern:*

Be it known that I, CHARLES WILLIAM RILEY, of Knoxville, in the county of Knox and State of Tennessee, have invented certain new and useful Improvements in Screw-Cutting Lathes, of which the following is a specification.

My invention relates to certain improvements in the gearing used to communicate motion from the live-spindle of a screw-cutting lathe to the feeding-screw that operates the slide-rest.

On lathes as commonly used at present the change in the gearing for obtaining the desired pitch of any thread to be cut is effected by removing one or more of the gear-wheels and inserting others in their places, such change involving labor and loss of time.

In a planing-machine it has been proposed to use two intermeshing series of gear-wheels, the wheels of one series running loosely on their spindle, and capable of being individually connected thereto at will; but such device is not practically adapted to a screw-cutting lathe, because it will not afford the required number of changes without increasing the length of the lathe to too great an extent.

In order to obviate these difficulties and yet keep the mechanism within the narrow limits to which the drive-gear of a lathe must be confined, I employ two systems of wheels, one system being driven from the live-spindle, and, in its turn, driving the other system that communicates directly with the feeding-screw. Each system consists of two series of wheels, each series having a common spindle or shaft, and the wheels of one series being fixed to their spindle and intermeshing with the wheels of the other series, which are made to turn loose upon their spindle, except when some one of them is thrown into rigid connection therewith by mechanism hereinafter described.

This mechanism for engaging and disengaging at will any one of the loose wheels with their supporting-shaft forms the second part of my invention; and it consists of a radially-sliding key or dog in the spindle or shaft operated by a pin sliding in an inclined slot in the same, and pushed in or out by a combined action of a central rod and an annular slide arranged concentrically within the spindle, (which is made hollow to receive them,) and extending beyond the end of the same.

In order that my invention may be fully understood, I will proceed to describe the same with reference to the accompanying drawings, in which—

Figure 3:
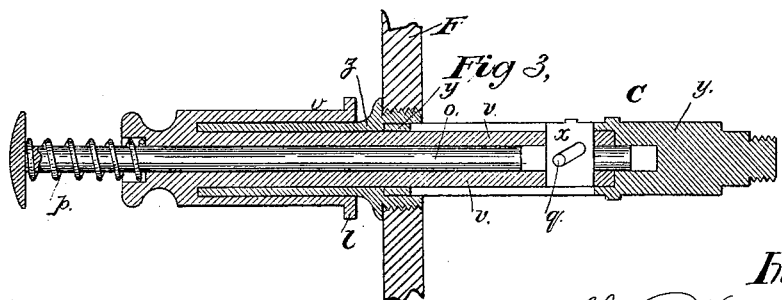
Figure 6:
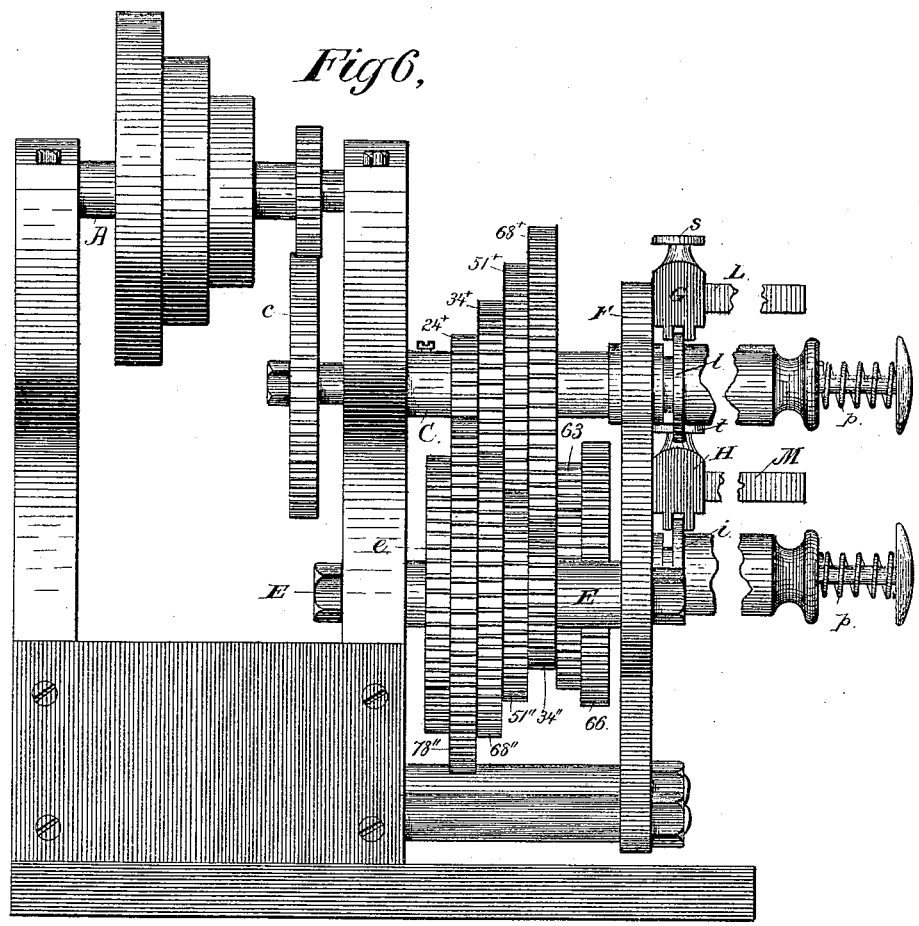

Figure 1 represents a front elevation of the head-gearing and part of the bed and part of the feeding-screw of a screw-cutting lathe, the said screw being intended to feed the tool-carriage (not shown) in customary manner. Fig. 2 is an end elevation of the said head-gear. Fig. 3 is a longitudinal section of one of the compound spindles, hereinafter described. Fig. 4 is a longitudinal section in the plane indicated by the line 4 4, Fig. 2. Fig. 5 represents an index-table. Fig. 6 is a rear elevation of the head-gearing.

In the drawings, A is the spindle, with which the work to be turned is connected and revolves. B is a part of the screw, which may have a pitch of four, more or less, to the inch, and serves to propel the sliding carriage (not shown) that holds the turning-tool. On the back end of the screw are fixed rigidly thereto six gear-wheels, 42 48 50 56 63 66, each containing a number of teeth corresponding to the figures thereon.

D is a revolving spindle, on which are seven gear-wheels, six of which, $56'$ $48'$ $40'$ $32'$ $28'$ $24'$, are free to move thereon independently of the motion of the spindle and of each other, and have teeth corresponding in number to the figures on each, and working, respectively, into the wheels fixed on the screw B. The seventh wheel, $d$, is fixed rigidly to the spindle D.

E is a stud, on which are five gear-wheels, fixed and revolving together, four of which, $34''$ $51''$ $68''$ $78''$, gear, respectively, into wheels on the spindle C, the fifth, $e$, gearing into and of the same number of teeth as the seventh wheel, $d$, on the spindle D.

The spindle C is constructed in the same manner as D, and has four wheels, $24^\times$ $34^\times$ $51^\times$ $68^\times$, with teeth corresponding in number to the figures on them, revolving in the same manner as those on D. On the end of the spindle C is a wheel, $c$, keyed to the spindle and gearing with a wheel of half its number of teeth, keyed to the main spindle A.

F represents a plate or standard, which supports and forms one of the bearings of the spindles C and D. In Fig. 3, which may represent a longitudinal section through the center of either of the spindles C or D, $y$ is a hollow spindle having a slot cut through it the width of the thickness of the adjustable key or dog $x$, and the length of the space that the wheels will occupy on the spindle. The spindle $y$ is supported at its outer end in a bearing, $z$, fixed on the standard F, Figs. 1 and 2, and extending outward therefrom in the form of a hollow stud, as represented in Fig. 3. Fitted concentrically in the hollow spindle $y$ are an annular slide, $v$, and a rod, $o$, capable of both common and relative movement longitudinally within said spindle, the slide $v$ being guided by the hollow stud $z$, and the rod $o$ by the slide $v$. The slide $v$ and rod $o$, as well as the spindle $y$, are slotted to receive the dog $x$, the slot in the slide $v$ being made to fit the dog, so as to effect its longitudinal adjustment, while that in the rod $o$ is longer than the width of the dog, so as to permit the relative endwise movement of the said rod, which moves the dog radially out and in by the agency of pin $q$, fixed in the rod $o$, and passing through an oblique slot in the dog $x$. To retract the dog $x$ within the spindle $y$ the fingers are applied to the head of the slide $v$, and the rod $o$ pressed in with the thumb. The slide $v$, carrying the dog, may then be moved endwise, as required, and on being released the rod $o$ is pushed out endwise by a spring, $p$, so as to advance the dog and cause it to engage with any one of the wheels to which it may be set. The adjustable key or dog $x$ slides in and throughout the length of the slot in the hollow spindle $y$, passes through a slot in the rod $o$, and is free to move up and down in a slot which it fits in the slide $v$, so as to engage with any one of the wheels on the spindle.

In Figs. 1 and 2, G and H are slides, having square holes, and free to slide on the square pieces L and M, which are screwed into the frame F. $s$ and $t$ are pins passing through the upper part of the slides G and H and into the square studs L and M, respectively. The said square studs have holes corresponding in number with the letters thereon to receive the pins $s$ and $t$. On the lower parts of the slides G and H are grooves to receive the collars $l$ and $i$ of the slides $v$.

We will now suppose that the spindles C and D are in the positions shown in the drawings, the pins $s$ and $t$ in the holes A' and F', respectively, and the keys $x$ (shown in Fig. 3) in the wheels 24˟ on spindle C, and 24' on spindle D, which positions will give the common feed for turning.

Now, suppose it is desired to cut a thread with a pitch of eight to the inch. The necessary adjustment is effected as follows: Lift the pin $s$ out of the hole in L and press the two knobs on the end of the spindle together. This will draw the key down and out of the wheel 24˟, leaving the parts $v$ and $o$ of the spindle, together with the key, free to move horizontally. Then by pulling these parts out the slide G will move with them. Pull the knobs until the pin-hole in G comes fair with the hole C' in L and drop the pin in, which will leave the key in wheel 51˟. Repeat the same with spindle D until the pin drops in hole I, which will leave the key in wheel 48' and give the desired pitch. Other pitches are obtained by setting the pins in the holes, as shown in the index-table, Fig. 5.

I am aware that it is not new to construct a feeding mechanism of two series of intermeshing gear-wheels, the wheels of one series fixed to their shaft, and the wheels of the other series revolving loosely upon, but capable of being individually keyed to, their shaft; but such a device is not well adapted to turning-lathes on account of the room required to accommodate it when sufficient wheels are added to cut the usual number of threads. Furthermore, in devices of this class as heretofore constructed it has always been necessary to either stop the machine when a change was to be made, or else to pass the locking-key slowly from one wheel to the other instead of directly to the desired wheel, whereas in my device, after having retracted the key, it may be slid back and forth to any desired position without stoppage or any unnecessary waste of time.

Having thus described my invention, the following is what I claim as new therein and desire to secure by Letters Patent:

1. In combination with two intermeshing sets or series of cog-wheels, the wheels of one series of which are mounted loosely on a common spindle, so that any one of said wheels may be placed in active connection therewith at will, a second double set or series of intermeshing cog-wheels having the wheels of one series loose and adapted to be severally connected with their spindle and employed for varying the speed of the first double series of cog-wheels, and in connection with the first series of wheels loose and adapted to be severally connected with their spindle employed for varying the speed of the feed-screw, as set forth.

2. In a screw-cutting lathe having a series of loose wheels with different numbers of teeth mounted on a common spindle, the combination of the radially-sliding key or dog $x$, operating-rod $o$, annular slides $v$, and sliding indexes G and H, substantially as and for the purposes set forth.

3. The combination of the spindle $y$, the annular slide $v$, rod $o$, pin $q$, and radially-sliding key or dog $x$, provided with an oblique slot to receive the said pin $q$, as and for the purposes set forth.

CHAS. WM. RILEY.

Witnesses:
CHAS. H. BROWN,
W. C. PERRY.